Sept. 3, 1963

R. E. SHEAHAN 3,102,298

SELF-BRAKING CASTER

Filed Sept. 17, 1958

INVENTOR
Robert E. Sheahan

By *A. J. Downer*

Attorney.

Sept. 3, 1963 R. E. SHEAHAN 3,102,298
SELF-BRAKING CASTER
Filed Sept. 17, 1958 2 Sheets-Sheet 2
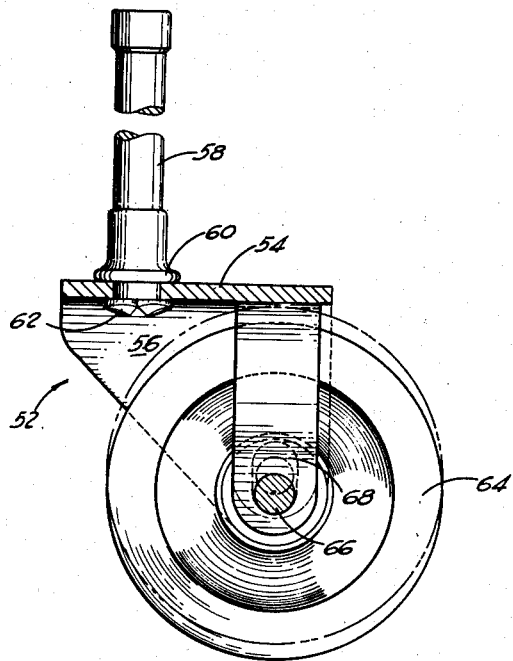
FIG. 5.
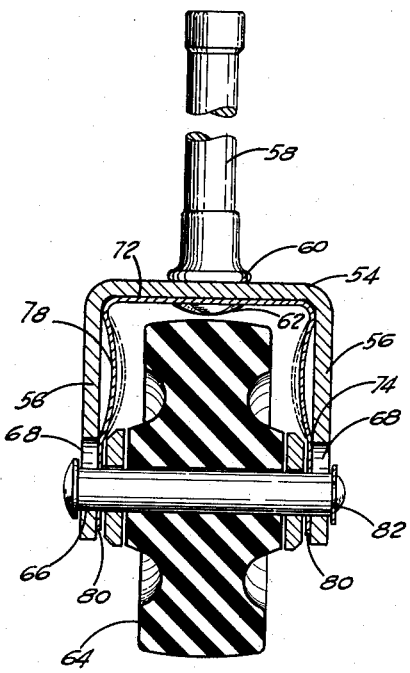
FIG. 6.
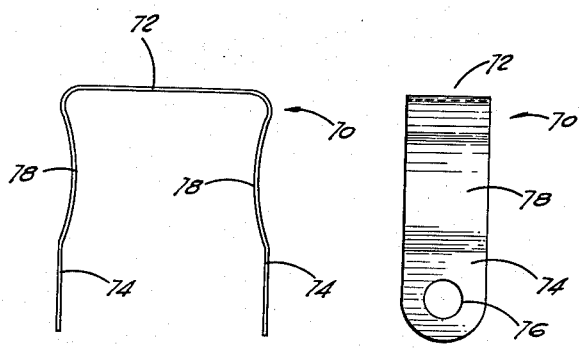
FIG. 7.   FIG. 8.
INVENTOR
Robert E. Sheahan.
By 
Attorney United States Patent Office 3,102,298
Patented Sept. 3, 1963

3,102,298
SELF-BRAKING CASTER
Robert E. Sheahan, Woodbridge, Conn., assignor, by mesne assignments, to Stewart-Warner Corporation, Chicago, Ill., a corporation of Virginia
Filed Sept. 17, 1958, Ser. No. 761,637
4 Claims. (Cl. 16—44)

This invention relates to caster structures and more particularly to a mounting arrangement for a caster wheel in which the caster wheel is prevented from rotating within the caster horn when the caster is subjected to overloading.

Casters have long been used on small carts and the like for allowing articles to be moved readily from place to place. In many cases, the carts or other vehicles for transporting the articles have been overloaded with resultant damage to the carts after continuously being subjected to such misuse. In addition, the casters normally incorporate a rotating wheel in which the axis of rotation remains fixed. To eliminate such overloading, and to provide a resilient mounting arrangement between the caster wheel and its associated horn, there have been provided in the past, caster wheel mounting arrangements which allow the caster wheel to move upwardly within the horn toward the load so that the caster will absorb any vibration caused by movement over a rough surface. In addition, such constructions allow the rotating caster wheel to contact the bottom surface of the associated caster horn so as to limit the amount of load which can be placed upon the individual caster and its associated apparatus. However, prior constructions for allowing such vertical movement of the wheel and axis have been somewhat complicated and have involved a relatively large number of parts.

It is, therefore, the primary object of the present invention to provide an improved self-braking caster of simplified construction which will greatly reduce the number of parts necessary to effect self-braking of the caster wheel.

It is a further object of this invention to provide an improved self-braking caster which will allow the caster to more fully absorb the vibration caused by passage of the caster over an uneven surface.

It is a further object of this invention to provide an improved self-braking caster which may be more easily assembled and in which the time and cost required to assemble a caster of this type is greatly reduced.

Other objects of this invention will be pointed out in the following detailed description and claims and illustrated in the accompanying drawing which discloses by way of example the principle of this invention and the best mode which has been contemplated of applying that principle.

In the drawing:

FIGURE 5 is a side view, partially in section, of a caster construction employing another embodiment of the present invention;

FIGURE 6 is a front view, partially in section, of the embodiment shown in FIGURE 5;

FIGURE 7 is a front view of the formed flat spring utilized in the embodiment shown in FIGURES 5 and 6 to provide a floating caster wheel mounting arrangement;

FIGURE 8 is a side view of the flat spring shown in FIGURE 7.

More specifically, one embodiment of the present invention provides a single element U-shaped spring member which is mounted within a conventional caster horn with the arms engaging the axle of the caster wheel between the wheel and the sides of the horn. There is further provided a vertically extending elongated slot within the sides of the horn so that the axis of the wheel may move vertically upwards toward the bottom surface of the horn. The single spring element resists upward movement of the wheel and the axis but upon sufficient loading of the caster, the upper periphery of the wheel comes into contact with the bottom surface of the caster horn to prevent further rotation of the caster wheel.

Figure 1:
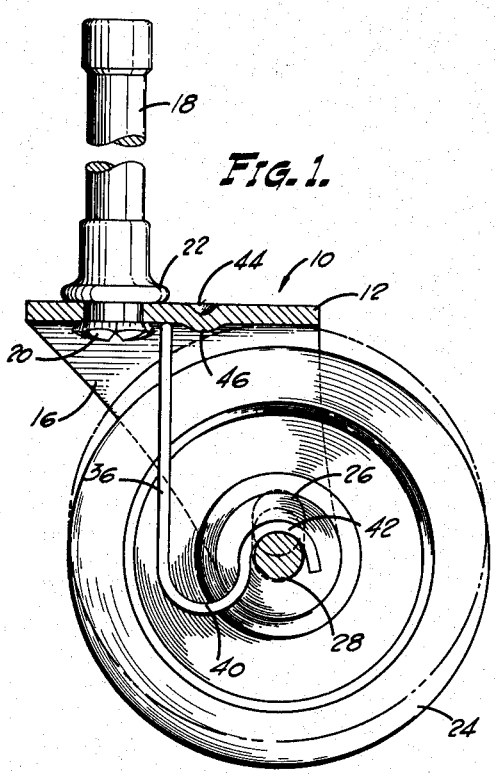
FIGURE 1 is a side view, partially in section, of a caster employing one embodiment of this invention.
Figure 2:
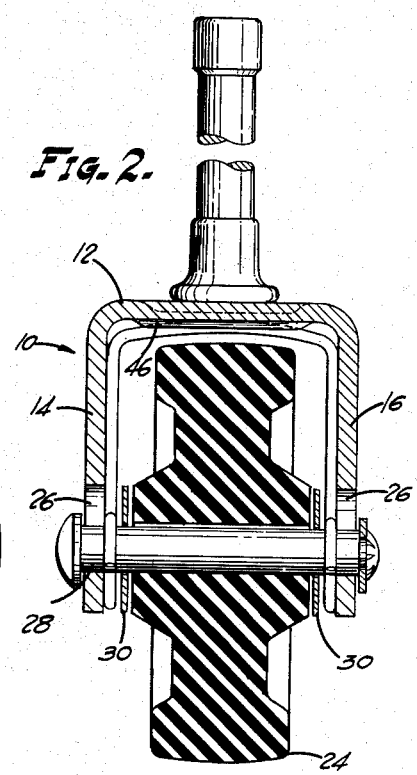
FIGURE 2 is a front view, partially in section, of the embodiment shown in FIGURE 1.

Referring now to FIGURE 1, there is shown a caster structure including a horn 10 having a flattened upper portion 12 and a pair of spaced downwardly directed walls or side portions 14 and 16. The horn may be constructed of suitable sheet metal in a conventional manner. There is further provided a pintle 18 which is rigidly secured to the top portion of the horn so that the caster may be mounted on its associated structure such as a truck or the like. In the embodiment shown, the pintle is rigidly attached by striking over the bottom end 20 thereof so as to compress the top of the horn 10 between the bottom end 20 and a flange portion 22 of the pintle adjacent the upper surface 12 of the top portion of the horn 10. In order that a wheel 24 may move in a vertical direction or in a direction parallel to the axis of the pintle 18, there is provided an elongated slot 26 within each of the side portions 14 and 16 of the horn. The slots 26 are of such a length that the caster wheel 24 will contact the bottom surface of the horn 10 before an axle 28 will contact the upper end of the elongated slot 26. Conventional washers 30 are positioned on either side of the wheel 24 between the wheel and the inner surface of the side portions 14 and 16 of horn 10.

Figure 3:
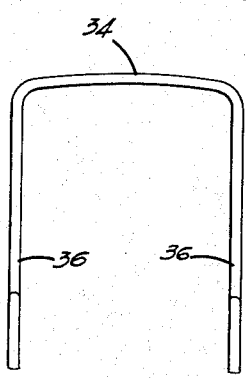
FIGURE 3 is a front view of the single element, resilient, formed wire, spring which provides an arrangement for floatingly mounting the caster wheel of the embodiment shown in FIGURES 1 and 2.
Figure 4:
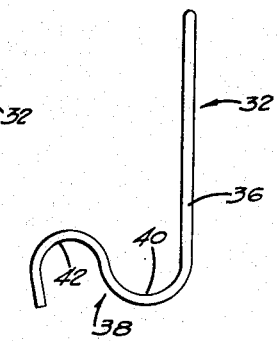
FIGURE 4 is a side view of the formed wire spring shown in FIGURE 3.

The present invention is directed to means whereby the caster wheel will be braked when the caster is subjected to a predetermined maximum load. In this regard, there is provided in the embodiment shown in FIGURES 1 through 4, a single element, wire, spring member 32 which is positioned between the wheel and the horn. As indicated in FIGURE 3, the U-shaped spring member 32, which is formed of hard draw spring wire such as music wire or the like, includes an upper portion 34 which forms the base of the U and a pair of spaced, generally parallel arms 36 which extend downwardly from the base 34. The bottom of each of the arms 36 terminates in a generally S shape or reverse turn portion 38 which is directed at an angle of approximately 90° away from the axis of each of the arms so as to provide a pair of oppositely directed semi-circular portions 40 and 42 therein. While FIGURE 3 shows the arms 36 of the spring member as parallel to each other, it may be desirable to have the arms formed so that they extend slightly away from each other toward their free ends for purposes which will be fully described later.

The U-shaped, single element spring member 32 is positioned upon the caster so that the outer semi-circular portion 42 of each of the arms contacts respective sides of the caster wheel axle 28 as indicated in FIGURE 1. In addition, the upper portion or base 34 of the spring member 32 is adapted to be positioned beneath the top portion 12 of horn 10 adjacent the inner end 20 of the pintle 18 in such a manner that a cantilever effect is produced within the spring thereby directing a downward resilient force upon the wheel axle 28. In this regard, the U-shaped spring member 32 is so formed that the vertical distance between the upper portion or base 34 and the inner semi-circular portion 40 of the spring member is slightly in excess of the distance between the top of the axle when positioned at the bottom of the elongated slot 26 and the bottom surface of the horn top portion 12. Thus, even though there is no load upon the caster, a downwardly directed force will be exerted by the U-shaped spring member 32 against the upper surface of axle 28. In order to ensure that the U-shaped spring member is correctly positioned within the caster structure, there is further provided a downwardly directed laterally extending indention 44 formed in the upper surface of the top portion 12 of the horn 10 such that a like proturberance 46 will be provided upon the bottom surface of the same horn top portion 12, which protuberance is slightly spaced from the pintle 18.

During assembly of the caster structure, the upper portion or base 34 of the U-shaped spring member is positioned between the bottom end 20 of pintle 18 and the protuberance 46. The spring forces set up during assembly will aid in holding the spring in position. The arms of the U-shaped spring member are then directed along the inner surface of the side portions 14 and 16 of the horn 10 so that the outer semi-circular portions 42 of the spring member 32 are aligned wih the elongated slot 26 formed within the same side portions 14 and 16. As noted previously, since the side portions have been so formed that their bottom ends are directed slightly outwardly, there is a slight compressive force exerted against the inner surfaces of the side portions 14 and 16 by each of the arms 36 which aids in locating the U-shaped spring member 32 within the bottom of the horn. After the U-shaped spring member has been inserted and positioned within the horn, the axle 26 is inserted within the elongated slot 26 formed within side portion 14 such that its upper surface will contact the outer semi-circular portion 42 of spring member 32. The caster wheel 24 and the associated washers 30 are then positioned upon the axle 28 and the axle is then passed through the second elongated slot 26 formed within the other side portion 16 and the end of the axle is riveted over in a conventional maner to hold the wheel upon the axle and to secure the spring member 32 within the assembly.

In operation, as the load is increased upon the caster, the wheel will tend to move upwardly within the elongated slot 26 against the bias of the U-shaped spring member 32 forcing the outer semi-circular portion 42 of the spring member to move along with the axle 28 toward the bottom surface of the top portion 12 of horn 10. After a predetermined load has been reached, the outer periphery of the wheel 24 will contact the bottom surface of the top portion 12 of the horn and any additional loading of the caster may be accomplished without further movement of the caster wheel in an upward direction. However, once the predetermined load has been placed upon the caster, the wheel will be effectively braked and rotation of the wheel will be prevented. When the overload is removed the bias of spring 32 will return the axle 28 and wheel 24 carried thereby to the normal operating position defined by the bottom of slot 26.

The present invention may be used in applications where it is desirous to have the vehicle unloaded during movement, and subsequently overloading the vehicle when the final position has been attained, thereby restraining the vehicle from further movement from that location except by removing a portion or all of the load. In addition, the present invention may be employed where it is desirous to provide a "floating" or "cushion" caster wheel suspension arrangement wherein the purpose of the structure is to provide a vibration dampening caster and where it is never intended to fully load the caster so that the wheel will be locked against the bottom surface of the horn. In order to prevent such locking action from occurring, the elongated slot 26 of the embodiment shown in FIGURE 1 may be of limited length such that the caster wheel periphery, even when the axle is moved to the upper limit within the elongated slot 26, will still not touch the bottom surface of the horn. Thus, there is provided a "floating suspension" for at least a portion of the load, such as that to which the caster is normally subjected. However, in either case the present invention provides a greatly simplified caster construction which allows for a cushion ride during light loading, and provides a convenient self-braking operation when the caster is subjected to excessive loads.

Another embodiment of the present invention is shown in FIGURES 5 through 8. Referring now to these figures, there is shown a caster structure which is similar to that of FIGURES 1 and 2 and includes a horn 52 having a generally flattened top portion 54 and a pair of spaced downwardly directed side portions 56. A mounting pintle 58 is rigidly secured to the upper surface of the top portion 54 of the horn. Conventional means are employed for rigidly securing these two members, for example, in the present embodiment, the top of the horn 54 is compressed between the flange 60 formed on the pintle and a deformed bottom end 62 of the pintle 58. A caster wheel 64 is positioned within the horn 52 by means of axle 66 so that the wheel may rotate relative to the horn. An elongated slot 68 is provided within both of the side portions 56 of the horn 52 so that the wheel and axle may move in an upward direction along a line parallel to the axis of the pintle a distance determined by the length of the slot and the diameter of the wheel.

To provide a biasing force tending to keep the wheel and axle in a position at the bottom of the elongated slot, there is provided a single element spring member 70 which is formed of flat spring steel stock. The spring member is generally U shaped in configuration and includes a top or base portion 72 and a pair of downwardly directed, spaced, generally parallel arms 74 as seen best in FIGURES 7 and 8. At the terminal portions of each arm 74 there is formed therein, an aperture 76, which is of a sufficiently large diameter to allow the axle 66 to pass therethrough. The U-shaped spring member is adapted to be positioned within the horn 52 so that the base portion of the spring member is contacting the bottom surface of the top portion 54 of the horn, while the arms of the spring member are directed downwardly along the inner surface of the side portions of the horn. It should be noted that the distance between the base 72 of the U-shaped spring member and the extreme bottom of the aperture is somewhat greater than the distance between the bottom surface of the top portion 54 of the horn to the lowest portion of the elongated slot 68 formed within the horn. The U-shaped spring member is further formed so that portions 78 of the arms intermediate of the aperture 76 and the base portion 72 bow inwardly toward each other. The bowed portions 78 of arms 74 allow the spring member to compress slightly so that the wheel and axle may move upwardly within the slot as the load upon the caster is increased.

During assembly of the caster, the axle may be inserted within the elongated slot 68 from either end, and as indicated in FIGURE 6, the axle 66 is inserted from left to right after the spring member 70 has been positioned within the horn 52. As the axle 66 is inserted within the aperture 76 formed within the arms and passes through the wheel 64 and its associated washers 80, the axle will exert a force upon the spring member tending to bow the inwardly curved portions 78 of the spring member toward each other so that the axle 66 may be positioned within the bottom of the elongated slot 68 under the influence of the compressive force set up within the U-shaped spring member 70. After the axle 66 has been positioned, the extreme outer end 82 is riveted to prevent the caster structure from being dismantled. It should be noted that the U-shaped spring member 70 will be securely positioned within the horn 52 and there will be no tendency for the spring to move relative to the horn since the compressive force set up within the arms of the spring member will tend to keep the flattened base portion 72 of the U-shaped spring tight against the flattened top portion 54 of the horn 52. As the caster structure is subjected to increased loading, there will be a tendency for the wheel 64 and axle 66 to move upwardly within the horn 52 until a predetermined load will cause the periphery of the wheel 64 to contact the bottom surface of the top portion 54 of the horn, thereby braking the caster wheel in an identical manner to the embodiment shown in FIGURE 1.

The present embodiment is also susceptible to use as a "floating" or "cushioned" wheel and axle caster structure should the elongated slot 68 be so limited in length that at no time will the periphery of the wheel contact the bottom surface of the caster horn, even when subjected to excessive loading. In such an instance, the top of the axle 66 will contact the top of the elongated slot 68 before the periphery of the wheel contacts the horn. This is not so in the preferred embodiment where the periphery of the wheel will always contact the bottom surface of the horn and the axle will be prevented from contacting the upper end of the elongated slot 68.

While there has been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A self-braking caster for a vehicle, comprising a top portion and substantially parallel side portions projecting downwardly therefrom, a brake surface associated with the underside of the top portion, a caster wheel and axle assembly disposed between the side portions generally below the brake surface, said side portions having aligned slots therein extending along a plane intersecting the brake surface, each of said slots terminating at its opposite ends, respectively, a distance from the brake surface greater than, and less than, the radius of the wheel, the axle being received in the slots and movable therein, and a single element spring having a U-shaped upper portion, the base of said U-shaped portion engaging the underside of said top portion and the arms of said U-shaped portion extending downwardly therefrom, aligned axle engaging surfaces on the free ends of the arms spaced from and opposing the base portion, each of said arms being bowed so that the linear length along the arms is greater than the straight line distance betwen the base portion and the axle engaging surface, said spring being disposed in the caster with the base portion directly engaging the top portion, the arms extending between the side portions on opposite sides of the wheel and the axle engaging surfaces directly engaging the axle, the free length of the spring arms between the axle engaging surfaces and base portion being greater than the distance between the lower ends of the slots and the spring engaging area of the top portion, so that the spring is operable both to support the caster resiliently and to deflect upon overload of the vehicle to brake the caster automatically.

2. A self-braking caster for a vehicle, comprising a top portion and substantially parallel side portions projecting downwardly therefrom, a brake surface associated with the underside of the top portion, a caster wheel and axle assembly disposed between the side portions generally below the brake surface, said side portions having aligned slots therein extending in a direction away from the brake surface and terminating at their opposite ends respectively, a distance from the brake surface greater than, and less than, the radius of the wheel, the axle being received in the slots and movable therein, and a single element spring having an intermediate base portion directly engaging the top portion and having a pair of generally parallel aligned arms projecting downwardly therefrom between the side portions on opposite sides of the wheel, said arms each including a generally straight upper portion terminating at its lower end to define a generally S-shaped end portion having its loops disposed on opposite sides of a plane extending through the lower ends at a sharp angle to the upper portions, said S-shaped end portions each having an arcuate inner portion concave toward the base portion and an arcuate outer portion concave away from the base portion, said outer concave portion directly engaging the axle, and the free length of the spring arms between the top portion and the outer concave portions being greater than the distance between the lower ends of the slots and the spring engaging area of the top portion, so that the spring operates both to support the vehicle resiliently and permit the brake surface to contact the wheel automatically upon overload of the vehicle.

3. In a caster having a caster horn and a wheel and axle assembly slidably mounted in slots in the horn for rotation relative to the horn, a single element spring for resiliently supporting the caster horn relative to said assembly, comprising a substantially straight intermediate base portion having a pair of aligned generally parallel arms projecting therefrom, said arms each having a generally straight portion adjacent the base portion and a generally S-shaped portion on the end thereof remote from the base portion, the S-shaped portion being disposed substantially symmetrically about a plane extending through the remote ends of the straight portions and at a sharp angle relative to the straight portions, each S-shaped end portion having a generally semi-circular inner portion concave toward the base portion and a generally semi-circular outer portion concave away from the base portion, said base portion being adapted to engage the caster horn and said outer semi-circular portions being adapted to engage the caster axle on opposite sides of the caster wheel, the free height of the spring arms from the base portion to the outer semi-circular portion being greater than the distance between the area of the caster horn engaging the spring and the portion of the slots furthest therefrom, so as to support the caster resiliently.

4. A self-braking caster for supporting a movable load of predetermined weight comprising a horn having a horizontal top plate portion, a pintle extending upwardly from said horizontal top plate portion and having a shoulder adjacent the lower end thereof engaging the upper surface of said top plate portion, a shank on said pintle extending downwardly from said shoulder through said top plate portion and having an enlarged head engaging and extending below the underside of said top plate portion, a brake portion which is integral with and in tracking position relative to said top plate portion, two substantially parallel leg flanges projecting downwardly from opposite sides of said top plate portion and from opposite sides of said brake portion, said leg flanges having corresponding aligned slots therein below said brake portion, a wheel between and spaced from said leg flanges and an axle extending through said wheel and through said slots, said slots being oriented to accommodate relative movement vertically between said axle and said horn from a first relative position wherein said brake surface is vertically spaced from the top portion of said wheel to a second relative position wherein said brake surface is in contact with said top portion of said wheel, and a spring operably disposed between said axle and said horn and biasing said horn upwardly toward said first relative position when said predetermined weight of said load is not exceeded and flexing when said predetermined weight of said load is exceeded to permit said brake surface to contact said top portion of said wheel said spring comprising a wire having a base bearing on the underside of said top plate portion and passing between said brake portion and said enlarged head, a pair of arms extending downwardly from said base between said leg flanges and on opposite sides of said wheel and having aligned curved axle-engaging portions directly engaging the top of said axle between said leg flanges and on opposite sides of said wheel, each of said arms being curved so that the linear length along said arms is greater than the straight line distance between said base and said curved axle-engaging portions so that the spring is operable both to support the horn resiliently and to deflect upon overload to brake the wheel automatically.

References Cited in the file of this patent

UNITED STATES PATENTS

| | | |
|---|---|---|
| 408,595 | Dion | Aug. 6, 1889 |
| 523,801 | Vegiard | July 31, 1894 |
| 853,551 | Keeler | May 14, 1907 |
| 968,790 | Olsen | Aug. 30, 1910 |
| 2,660,465 | Gerson | Nov. 24, 1953 |
| 2,885,720 | Seeberger | May 20, 1959 |

FOREIGN PATENTS

| | | |
|---|---|---|
| 582,371 | Great Britain | Nov. 13, 1946 |